United States Patent [19]

Larsson

[11] Patent Number: 4,518,251
[45] Date of Patent: May 21, 1985

[54] APPARATUS FOR HANDLING SHEETS FOR MICROFILMING OR OTHER SIMILAR RECORDING

[76] Inventor: Ingemar Larsson, Hjortrongränd 39, S-182 45 Enebyberg, Sweden

[21] Appl. No.: 491,965
[22] PCT Filed: Aug. 20, 1982
[86] PCT No.: PCT/SE82/00267
  § 371 Date: Apr. 20, 1983
  § 102(e) Date: Apr. 20, 1983
[87] PCT Pub. No.: WO83/00748
  PCT Pub. Date: Mar. 3, 1983

[30] Foreign Application Priority Data

Aug. 20, 1981 [SE] Sweden .................. 8104948

[51] Int. Cl.³ .................................... G03B 27/62
[52] U.S. Cl. ............................. 355/75; 355/50; 355/64; 355/76
[58] Field of Search ............ 355/50, 51, 40, 64, 355/65, 75, 76

[56] References Cited

U.S. PATENT DOCUMENTS 2,849,916 9/1958 Nolan .................. 355/64

Primary Examiner—Richard A. Wintercorn
Attorney, Agent, or Firm—Pollock, Vande Sande & Priddy

[57] ABSTRACT

An exposure table (20) included in an apparatus for handling sheets for microfilming or other similar recording is provided with slots (28) open through the table surface (27) facing the camera (14). Sheet drivers (22) run in these slots for feeding a sheet stepwise to the exposure table, said drivers being fastened to conveyor belts (21) running in channels (26) below the table surface (27). The conveyor belts have preferably a feed direction that forms a small angle ($v_1$) with a guide ledge (23) along one table edge extending in the conveyor direction. Moreover, the exposure table is preferably provided with means (29, 30) for sucking by vacuum each sheet firm on the exposure table surface.

10 Claims, 4 Drawing Figures

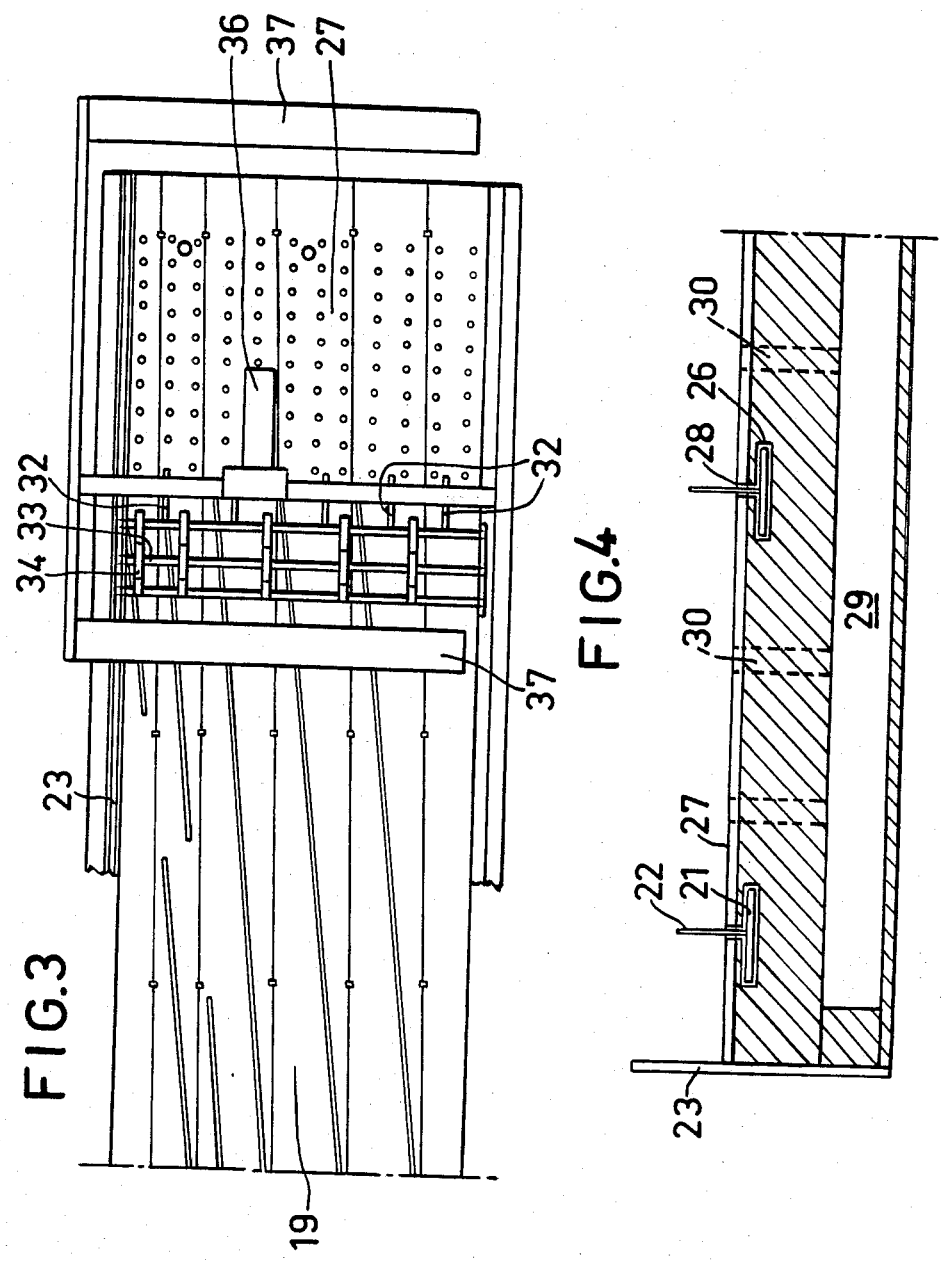

APPARATUS FOR HANDLING SHEETS FOR MICROFILMING OR OTHER SIMILAR RECORDING

The present invention relates to an apparatus for handling sheets (documents) for microfilming or other similar recording such as image digitalation and also for scanners and other readers reading alphanumeric characters or symbol codes. The apparatus includes in this respect a conveyor path fed step-by-step, a positioning portion on the conveyor for positioning a sheet one by one in flat state on the conveyor, an exposure table with plane surface arranged in the conveying direction after said positioning portion, and a microfilm camera or other equipment for digitalation or reading arranged above the exposure table.

It is extremely important for correct microfilming that the sheet will have exact position on the exposure table relative to the camera. Both upon manual positioning of the sheets and to a still more extent upon automatic positioning, it can be difficult to obtain a sufficient exactness for the position of the sheets on the exposure surface. Besides microfilming and image digitalation this is also valid for scanners and other readers which on a limited surface read characters or symbol codes. A non-correct positioning of sheets can besides carelessness depend on sheet defectives or on the positioning mechanism. The sheets can also lay irregularly in a sheet store.

In a known microfilming apparatus of above mentioned kind, in which the conveyor consists of an endless mat for conveying sheets to the exposure table, photocells and other sensors indicate that the sheets have desired position. Should this not be the case, the process is interrupted. Thus, non-correctly positioned sheets implies a disturbance in the production. If the disturbances are frequent, an automatic feeding can be made impossible. Moreover, such a position indication is comparatively complicated and expensive.

By the present invention the above mentioned problems have been solved with simple but yet always reliable means, which compared with said known apparatus also is accompanied by a considerable cheaper construction. The positioning of the sheets becomes in spite of the simple means always exact and therefore there are no need for position sensors.

The characteristics of the invention to achieve this appear from the following claims.

An embodiment of the invention is in the following described more in detail with reference to the accompanying drawings, in which:

FIG. 3 is a top view showing the right part of the apparatus and also showing camera equipment and sheet turn device;

FIG. 4 illustrates a part of a section through the exposure table.

Figure 1:
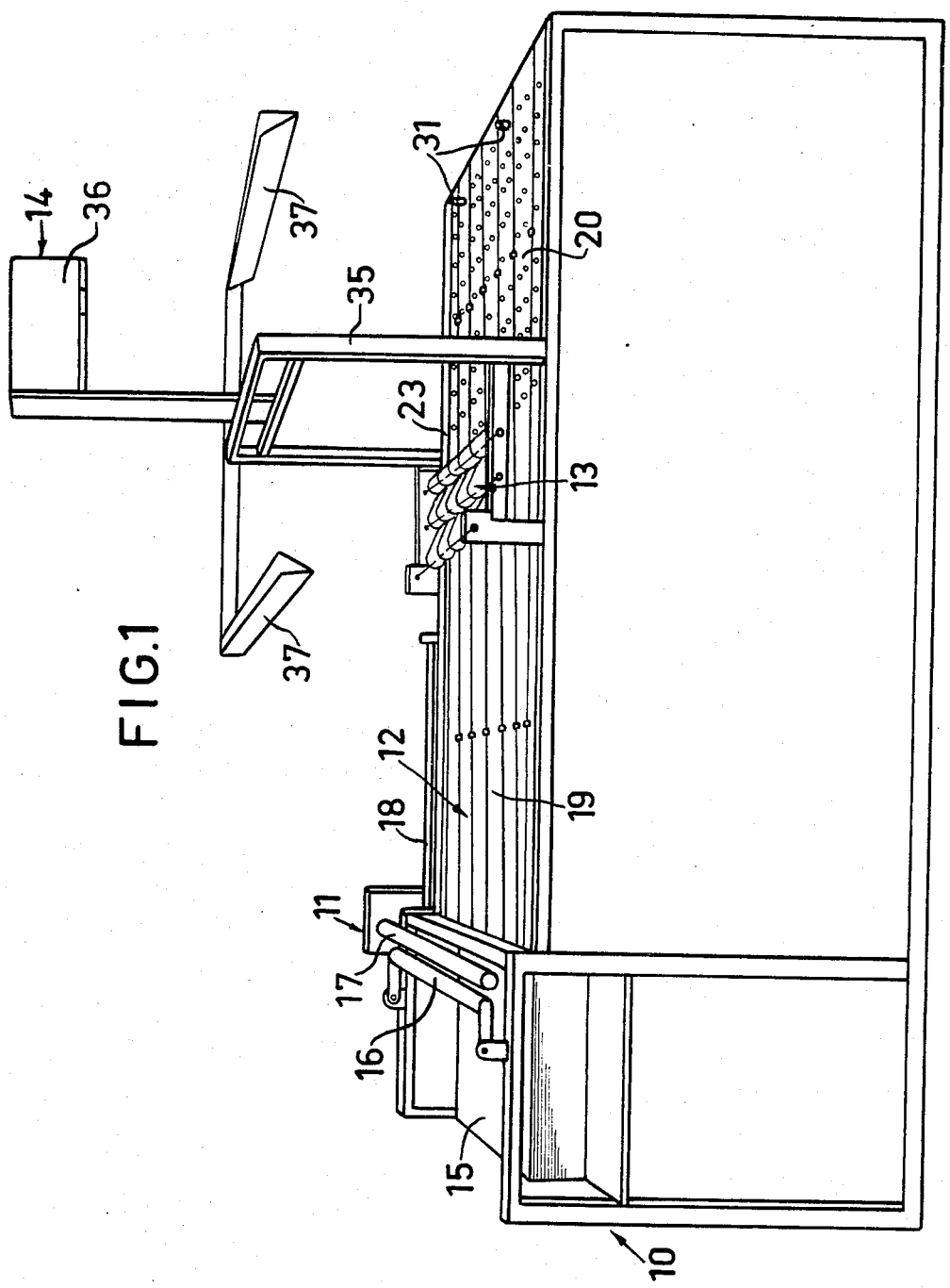
FIG. 1 is a perspective view somewhat schematically illustrating the embodiment of an apparatus according to the invention.

The apparatus according to the invention as shown consists in its main components of a sheet store 10, a sheet feeder mechanism 11, a conveyor path 12, a sheet turn mechanism 13 and a camera equipment 14. Although not shown, there are furthermore drive means and control systems for the various operations performed in the apparatus.

The store 10 is positioned at one end of the conveyor and includes a stack of sheets 15. The sheet feeder mechanism 11 is journalled above the store and consists of a sheet lifting arm 16, which by means of vacuum or suction lifts the top sheet in the sheet stack, and a sheet extractor arm 17, which sucks up a lifted sheet and draws the sheet out on the conveyor by reciprocating motion along a slide rod 18.

Figure 2:
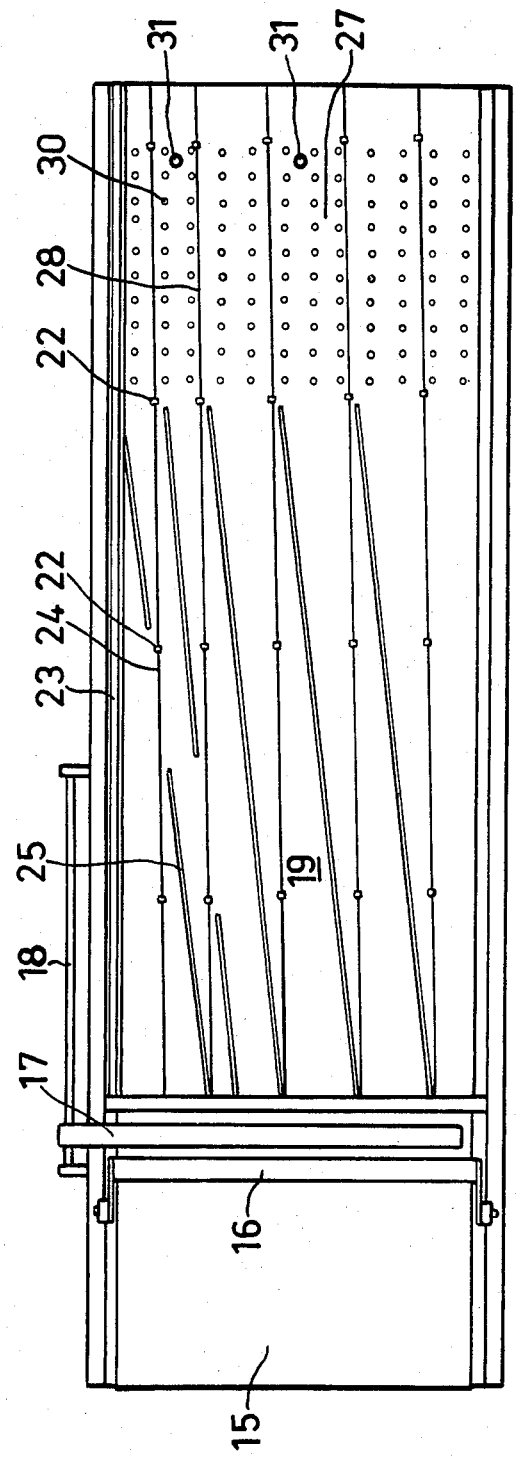
FIG. 2 is a top view of the apparatus showing a sheet store and sheet conveyor with sheet positioning portion and exposure table.

The conveyor path 12 consists of a positioning portion 19, on which the sheet extractor 17 lays in flat state a sheet drawn from the store 10, and an exposure table 20 arranged in the conveying direction after the positioning portion. A conveyor device consisting of endless parallel belts 21 (see FIG. 4) is arranged for feeding one sheet at the time to position on the exposure table. The belts are controlled fed step-by-step and are for this feed provided with rows of projecting drivers in the form of riders 22, the distance between adjacent rows of riders being larger than the length of a sheet in the conveying direction. A guide ledge 23 is arranged along one longitudinal edge of the conveyor 12 and the belts 21 are for guided feed of the sheets to abutment against the guide ledge arranged with a feed direction that forms a small angle $v_1$ relative to the guide ledge. This angle is in FIG. 2 shown as the angle between the feed direction of the riders 22, illustrated with the reference numeral 24, and the guide ledge 23. In order to enforce this drawing of the sheets towards and against the guide ledge 23, the positioning portion 19 is, as schematically shown, provided with projecting slide bars 25 in contact with the sheets, said slide bars having a larger angle $v_2$ with the guide ledge than said belt angle $v_1$.

The construction of the exposure table 20 is best shown in FIG. 4. The belts 21 run in channels 26 adapted to the width of the belts below the surface 27 of the exposure table and the riders 22 run during the feed in upwardly open slots 28 extending in the feed direction of the riders. The exposure table is furthermore provided with a vacuum box 29 extending below the exposure surface 27 and channels 30 extending from the box and through the exposure surface. Finally, the exposure table is provided with sheet stop means in the form of spikes 31 or the like which are guidingly movable between a position, in which the spikes project above the exposure surface 27, and a position below the exposure surface.

The sheet turn mechanism 13 arranged between the positioning portion 19 of the conveyor 12 and the exposure table 20 has a number of tongues 32, for instance resilient wires or bands pivotally mounted, which abut the conveyor path in such a manner, that they do not hinder the transport of the sheets forward. Upon driving the conveyor belts 21 backwards for turning a sheet, the sheet is catched by the tongues 32 and fed in between rolls 33 and belts 34, which are arranged such that the sheet, upon the feed thereof from the sheet turn mechanism to the exposure table, will expose the opposite side to the camera equipment 14.

The camera equipment 14 arranged above the exposure table 20 consists of a planetary microfilm camera 36, attached to a stand 35, and light ramps 37. The camera stand 35 may for adaptation to different sheet sizes be arranged displaceable on a frame supporting the stand.

When microfilming or image digitalation great demands are above all made upon a flat exposure surface, an exact positioning of the sheet on the exposure surface and a tight abutment of the sheet against the exposure surface in order to botain a uniform lightening of the sheet and to hinder an ununiform and disturbing underlight on the sheet from reflecting light from the exposure surface. Moreover, shadowing effects from, for instance, the sheet followers must be eliminated. By the present invention, for instance an apparatus as described above and shown on the drawings, these demands have with simple means been met.

In a construction according to the invention the demand on the planeness of the exposure surface is met at the same time as the plane surface of the conveyor path/the exposure table renders a building-up of scanners and other equipment requiring a plane and stable support possible. Thus, a reading of for instance codes can take place parallel with the microfilming. These codes can together with exposure counters form basis for storing addresses to the microfilm, for instance in a data base.

The exact positioning and correct abutment of a sheet on the exposure table 20 is guaranteed by the guide ledge 23 and the feed direction of the conveyor belts 21 in an angle $v_1$ relative to the guide ledge. This drawing of the sheet towards and against the guide ledge can be still more guaranteed by the arrangement of the slide bars 25. As mentioned above, the belts 21 are fed step-by-step and is stopped when a sheet is in position on the exposure table. The sheet can, after that the belts have been stopped, slide further some cm. In order to obtain the exact positioning also in the feed direction, said sheet stop means 31 are arranged which during the stop moment protrude above the exposure surface but during filming and belt feed are drawn below the surface by actuation of the apparatus control system and for instance electromagnets. Vaccum from the vacuum box 29 and channels 30 contributes to the abutment tight against the plane exposure surface.

The shadowing effects can be eliminated in several ways. One way is described above by the further sliding some cm to abutment against the stop means 32 and their drawing down below the exposure surface during filming. Another way to avoid shadowing from the riders 22 and particularly in a construction, which lacks said stop means and the riders in the correct stopped position of the sheet abut the sheet, is to back the conveyor belts a distance, for instance 1 cm. Another shadowing effect can be obtained from the guide ledge 23, if the light ramps 37 should be positioned parallel with the guide ledge instead of perpendicular to the ledge as in the illustrated apparatus. In this case, the guide ledge can during the filming be drawn away, for instance by means of draw magnets, which can be coordinated with the suction of a sheet on the exposure table by means of vacuum. The guide ledge may possibly be made so low that the shadowing can be accepted.

As to the control system (not shown) for the control of all apparatus operations such as operation of sheet lifter 16 and sheet extractor 17, feed of conveyor 21, back feed of conveyor 21 in order to back riders 22 some cm and for sheet turning, wherein the conveyor and the sheet turning mechanism are motor-driven, operation of vacuum pump, operation of stop means, etc., said system may consist of a conventional electronic control system. By such a system the process is fully automatic. An automatic operation of sheet lifter and sheet extractor may possibly be omitted and the positioning of sheets on the conveyor path 12 take place manually.

The invention is not limited to the embodiments described above and shown on the drawings but can be varied in different ways within the frame of the following claims. Thus, the number of conveyor belts can be varied and also only one belt running in a corresponding channel in the exposure table can be used even if several belts would seem to be preferred.

I claim:

1. An apparatus for handling unperforated sheets for microfilming or other similar recording, including a conveyor path (12) fed step-by-step, a positioning portion (19) on the conveyor for positioning a sheet in a flat state on the conveyor, an exposure table (20) with a plane surface arranged in the conveying direction after said positioning portion, and a microfilm camera or other equipment for digitalation or reading arranged above the exposure table, characterized in that said exposure table (20) is provided with parallel slots (28) open through the table surface (27) facing the camera and extending in the conveying direction; that said conveyor path (12) runs below said table surface (27) and is provided with sheet drivers (22) projecting above said table surface and running in said slots (28), said sheet drivers (22) being arranged in rows extending crosswise the conveying direction and with a distance between adjacent rows at least equal to the extension of a sheet in the conveying direction; and that positioning means (23) is arranged for correct positioning of said unperforated sheets during the microfilming or other similar recording operations.

2. An apparatus according to claim 1, characterized in that the conveyor path (12) consists of parallel belts (21) in number coincident with the number of sheet drivers (22) in each row.

3. An apparatus according to claim 1, characterized in that the exposure table (20) is provided with means (29, 30) for producing vacuum below a sheet on the exposure table during the filming.

4. An apparatus according to claim 1 or 8, characterized by stop means (31) for stopping a sheet in said correct position thereof on the exposure table, and means for drawing said stop means below the exposure table surface (27) during the feed of the conveyor path (12) after the filming.

5. An apparatus according to claim 4, characterized in that said drawing means is arranged for drawing said stop means (31) below the exposure table surface (27) also during filming.

6. An apparatus according to claim 5, characterized in that said stop means (31) is movable a short distance in the conveying direction.

7. An apparatus according to claim 1, characterized by means for moving the conveyor path (12) a short distance opposite to the conveying direction after a sheet has been positioned in correct position on the exposure table (20).

8. An apparatus according to claim 1, characterized in that said positioning means (23) consists of an abutment surface extending along the exposure table (20) in the conveying direction and arranged for the abutment of a sheet in said correct position thereof, and that the belts (21) have a movement direction forming a small angle ($v_1$) with the abutment surface of the guide ledge against the sheet.

9. An apparatus according to claim 1, characterized by a sheet turn mechanism (13) positioned in the conveying direction ahead of the exposure table (20) and above the conveyor path (12).

10. An apparatus according to claim 1, characterized in that the stop position for the stepwise fed conveyor path (12) and thereby the sheet drivers (22) is displaceable in the conveying direction for adjustment to different sheet sizes.

* * * * *